United States Patent
Liang et al.

(10) Patent No.: US 8,668,842 B2
(45) Date of Patent: *Mar. 11, 2014

(54) METHOD FOR HEAT TREATING A CARBON COATED ALKALI METAL OXYANION ELECTRODE MATERIAL

(75) Inventors: Guoxian Liang, St-Hyacinthe (CA); Jasmin Dufour, Lemoyne (CA); Michel Gauthier, La Prairie (CA); Nathalie Ravet, Montreal (CA); Denis Geoffroy, Verdun (CA)

(73) Assignee: Clariant (Canada) Inc. (CA)

( * ) Notice: Subject to any disclaimer, the term of this patent is extended or adjusted under 35 U.S.C. 154(b) by 213 days.

This patent is subject to a terminal disclaimer.

(21) Appl. No.: 12/972,009

(22) Filed: Dec. 17, 2010

(65) Prior Publication Data

US 2011/0210293 A1    Sep. 1, 2011

Related U.S. Application Data

(60) Provisional application No. 61/287,200, filed on Dec. 17, 2009.

(51) Int. Cl.
*H01M 4/88* (2006.01)

(52) U.S. Cl.
USPC ........................................... 252/182.1

(58) Field of Classification Search
USPC .............................. 252/500, 502, 518.1
See application file for complete search history.

(56) References Cited

U.S. PATENT DOCUMENTS

| | | | |
|---|---|---|---|
| 2,585,462 A * | 2/1952 | Hirsch ........................... | 422/111 |
| 5,910,382 A | 6/1999 | Goodenough et al. | |
| 6,514,640 B1 * | 2/2003 | Armand et al. ............ | 429/231.1 |
| 6,855,273 B2 | 2/2005 | Ravet et al. | |
| 6,962,666 B2 | 11/2005 | Ravet et al. | |
| 7,285,260 B2 | 10/2007 | Armand et al. | |
| 7,344,659 B2 | 3/2008 | Ravet et al. | |
| 7,457,018 B2 | 11/2008 | Armand et al. | |
| 7,601,318 B2 | 10/2009 | Armand et al. | |
| 7,815,819 B2 * | 10/2010 | Ravet et al. .................. | 252/506 |
| 2005/0142056 A1 | 6/2005 | Barker et al. | |
| 2008/0090150 A1 * | 4/2008 | Nakura ......................... | 429/223 |
| 2010/0297496 A1 * | 11/2010 | Ravet et al. .................. | 429/207 |

FOREIGN PATENT DOCUMENTS

| | | |
|---|---|---|
| WO | WO 01/84655 | 11/2001 |
| WO | WO 02/27823 | 4/2002 |
| WO | WO 02/27824 | 4/2002 |
| WO | WO 03/038930 | 5/2003 |

(Continued)

OTHER PUBLICATIONS

Maier et al. "Defect Chemistry of LiFePO$_4$" *Journal of the Electrochemical Society* 155(4) A339-A344 (2008).

(Continued)

*Primary Examiner* — Mark Kopec
*Assistant Examiner* — William Young

(57) ABSTRACT

A process for preparing an alkali metal oxyanion electrode material having a carbon coating deposited by a thermal treatment, said process comprising a thermal step under a humidified atmosphere of: (i) said alkali metal oxyanion electrode material having a carbon coating deposited by a thermal treatment; (ii) precursors of said alkali metal oxyanion electrode material and an organic precursor of carbon; or (iii) said alkali metal oxyanion electrode material and an organic precursor of carbon, wherein said thermal step is performed at a temperature in the range of about 300° C. to about 950° C.

15 Claims, 11 Drawing Sheets

(56) References Cited

FOREIGN PATENT DOCUMENTS

| WO | WO 03/077335 | | 9/2003 |
|----|----|----|----|
| WO | WO 2008/033672 | | 3/2008 |
| WO | WO 2008/062111 | | 5/2008 |
| WO | WO 2008/062111 | A2 * | 5/2008 |
| WO | WO 2009/096255 | | 8/2009 |
| WO | WO 2010/120690 | | 10/2010 |
| WO | WO 2010/134579 | | 11/2010 |

OTHER PUBLICATIONS

Wagemaker et al. "Proof of Supervalent Doping in Olivine $LiFePO_4$" *Chemistry of Materials* 20(20) 6313-6315 (2008).

Wang et al. "High-Performance, Nano-Structured $LiMnPo_4$ Synthesized via a Polyol Method" *Journal of Power Sources* 189: 624-628 (2009).

* cited by examiner

METHOD FOR HEAT TREATING A CARBON COATED ALKALI METAL OXYANION ELECTRODE MATERIAL

CROSS-REFERENCE TO RELATED APPLICATION

This application claims the benefit of U.S. Provisional Application 61/287,200, filed Dec. 17, 2009, the contents of which are herein incorporated by reference in their entirety.

BACKGROUND OF THE INVENTION

1. Field of the Invention

The present invention relates to the field of improving the electrochemical performances of an alkali metal oxyanion electrode material, and more specifically, to a process for improving the electrochemical performances of an alkali metal oxyanion electrode material having a pyrolitic carbon deposit thereon as well as to the alkali metal oxyanion electrode material obtained therefrom.

2. Description of the Related Art

Alkali metal oxyanions, useful as cathode material, have been shown to present problems relating to electrochemical performances. Undesirable low electronic conductivity is one example of such problem. One significant improvement to the problem of low electronic conductivity of alkali metal oxyanion material, for instance of alkali metal phosphate, has been achieved with the formation of a carbon deposit on the surface of the material. Ravet [e.g., U.S. Pat. No. 6,855,273, U.S. Pat. No. 6,962,666, U.S. Pat. No. 7,344,659, U.S. Pat. No. 7,815,819, U.S. Pat. No. 7,285,260, U.S. Pat. No. 7,457,018, U.S. Pat. No. 7,601,318, WO 02/27823 and WO 02/27824)] has proposed using an organic carbon precursor that is pyrolysed onto the cathode material or its precursors, thus forming a carbon deposit, to improve electrical field at the level of the cathode particles.

In the specific case of carbon-deposited lithium iron phosphate, referred to as C—$LiFePO_4$, several processes have been used to obtain the material, either by pyrolysing a carbon precursor on $LiFePO_4$ powder or by simultaneous reaction of lithium, iron and $PO_4$ sources and a carbon precursor. For example, WO 02/27823 and WO 02/27824 describes a solid-state thermal process allowing synthesis of C—$LiFePO_4$ through following reaction:

$Fe(III)PO_4 + ½Li_2CO_3 + $ carbon precursor → 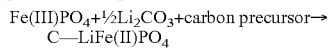
C—$LiFe(II)PO_4$

In which the carbon precursor is an organic material that forms a carbon deposit through pyrolysis while generating reducing gases that efficiently reduce the iron (III).

Such process has been scaled-up to produce large quantity of battery grade cathode material. However, as "one-pot" solid-state process involving numerous simultaneous chemical, electrochemical, gas-phase, gas-solid reactions, sintering and carbon deposition, C—$LiFePO_4$ electrochemical properties are dependent on numerous parameters such as surface properties, wettability, surface area, porosity, particle size distribution, water-content, crystal structure, as well as on the raw materials chemistry, reactor feed rate, flow of gas, etc. In consequence, undesirable fluctuations on cathode material properties, especially electrochemical capacity (mAh/g), have been observed.

Problems remain to find a simple and cost-effective chemical treatment allowing to up-grade quality and consistency of commercial products for battery applications.

SUMMARY OF THE INVENTION

In one broad aspect, the invention relates to a method for increasing the electrochemical performance of an alkali metal oxyanion electrode material having a pyrolitic carbon deposit thereon, comprising heat treatment, under a humid atmosphere, of the alkali metal oxyanion electrode material having the pyrolitic carbon deposit thereon or precursors of the alkali metal oxyanion electrode material having the pyrolitic carbon deposit thereon.

In a non-limiting embodiment, the improved electrochemical performances relate to consistency and mean electrochemical capacity of the treated material.

In a non-limiting embodiment, the improved electrochemical performances relate to the activation of the treated material.

In a non-limiting embodiment, the improved electrochemical performances relate to the shape of the voltage discharge curve or power capability as expressed in a ragone plot of the treated material.

In a non-limiting embodiment, the improved electrochemical performances relate to the specific electrochemical capacity (mAh/g) of the treated material.

In a non-limiting specific embodiment, the improved electrochemical performances relate to the specific surface area (BET in $m^2/g$) of the treated material.

In a non-limiting embodiment, the heat treatment includes treatment at a temperature selected within the range of: about 300° C. to about 950° C., about 350° C. to about 950° C., about 400° C. to about 950° C., about 450° C. to about 950° C., about 500° C. to about 950° C., about 550° C. to about 950° C., about 600° C. to about 950° C., about 650° C. to about 950° C., about 700° C. to about 950° C., about 750° C. to about 950° C., about 800° C. to about 950° C., about 850° C. to about 950° C., or about 900° C. to about 950° C.

In a non-limiting embodiment, the heat treatment includes treatment at a temperature selected within the range of: about 300° C. to about 950° C., about 300° C. to about 900° C., about 300° C. to about 850° C., about 300° C. to about 800° C., about 300° C. to about 750° C., about 300° C. to about 700° C., about 300° C. to about 650° C., about 300° C. to about 600° C., about 300° C. to about 550° C., about 300° C. to about 500° C., about 300° C. to about 450° C., about 300° C. to about 400° C., or about 300° C. to about 350° C.

In a non-limiting embodiment, the heat treatment includes treatment at a temperature in the range of about 300° C. to about 950° C., preferably at a temperature in the range of about 450° C. to about 850° C., and most preferably at a temperature in the range of about 550° C. to 750° C.

It is noted that the temperature at which the heat treatment is performed can be selected without undue effort by the person skilled in the art based on the teaching described herein.

In a non-limiting embodiment, the humid atmosphere is a gas, or a mixture of gases, having particular water content. In a specific implementation, the gas or mixture of gases is selected from the group consisting of $N_2$, argon, helium, $NH_3$, $CO$, $CO_2$, and any mixtures thereof. In yet a specific implementation, the gas is bubbled in water in order to obtain the humid atmosphere.

In a non-limiting embodiment, the duration time of the process of the invention is from about 10 minutes to about 10 hours, preferably from about 1 hour to about 3 hours. In another non-limiting embodiment, the duration time of the process of the invention is from about 10 minutes to about 300 minutes, or from about 20 minutes to about 60 minutes, or from about 20 minutes to about 2 hours.

In a non-limiting embodiment, subsequent to the process of the invention, porosity of a cathode comprising an alkali metal oxyanion electrode material having a pyrolitic carbon deposit thereon is relatively improved by 20 to 40%.

In a non-limiting embodiment, subsequent to the process of the invention, capacity determined at C-rate equal or less than C/10 of an alkali metal oxyanion electrode material having a pyrolitic carbon deposit thereon is relatively improved by 10 to 40%, and variation of capacity is less than 20% from batch to batch, preferably less than 10%, and more preferably less than 5%.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

A detailed description of examples of implementation of the present invention is provided hereafter with reference to the following figures, in which.

DESCRIPTION OF ILLUSTRATIVE EMBODIMENTS

Figure 1:
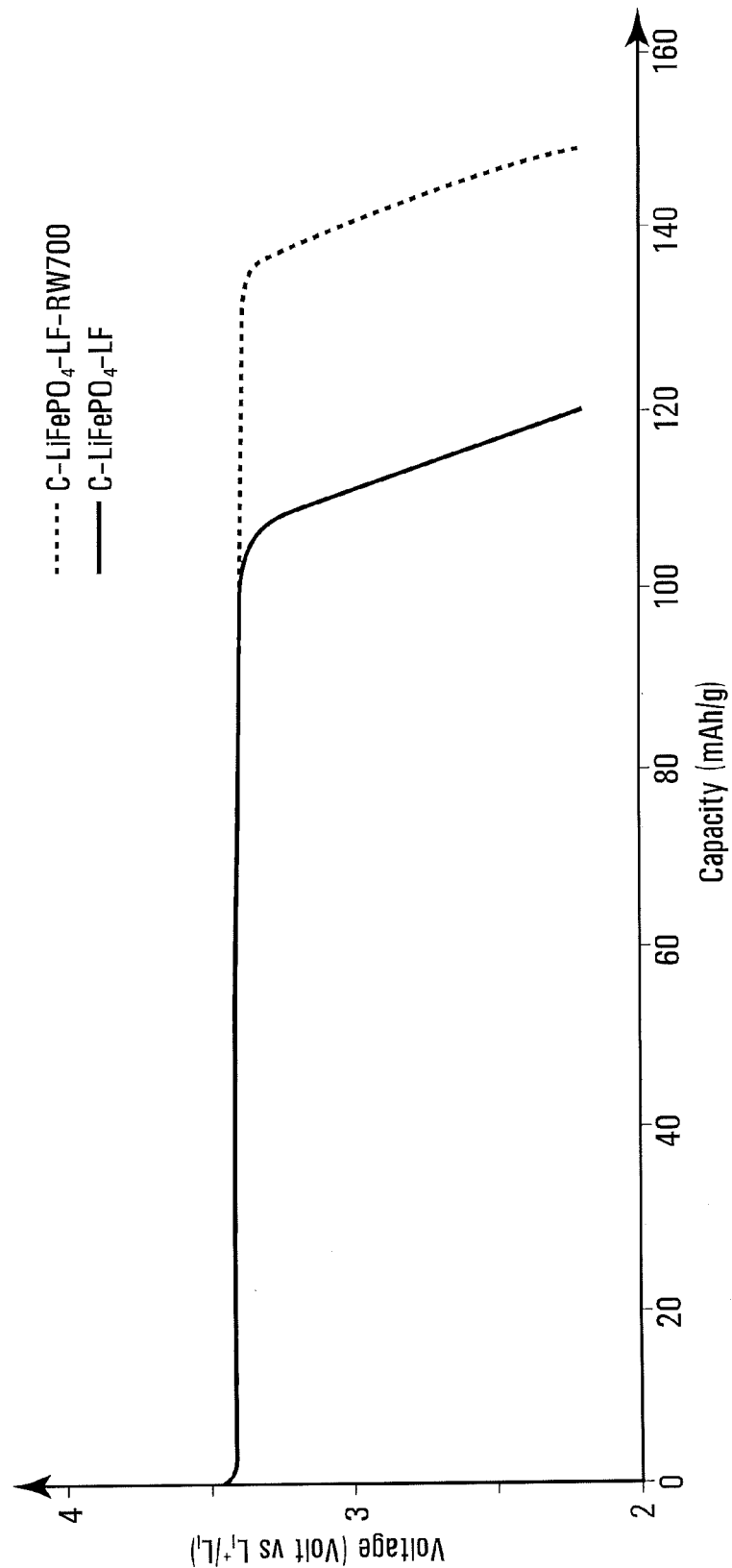
FIG. 1 illustrates cathode capacity, after and before retreatment, determined at room temperature and C/10 discharge rate ($1^{st}$ cycle), for two A and B Li/1M $LiPF_6$ EC:DEC 3:7/C—$LiFePO_4$ batteries. Battery voltage (in Volt vs $Li^+$/Li) is indicated on Y axis and capacity (in mAh/g) is indicated on X axis. Battery A has been prepared with a positive electrode containing C—$LiFePO_4$ retreated at 700° C. under a humid nitrogen atmosphere (C—$LiFePO_4$-LF-RW700 obtained in example 5), battery B with the same C—$LiFePO_4$ lot without retreatment (C—$LiFePO_4$-LF obtained in comparative example 4). Retreatment by humid nitrogen improves capacity (mAh/g) by ca. 25%.
Figure 2:
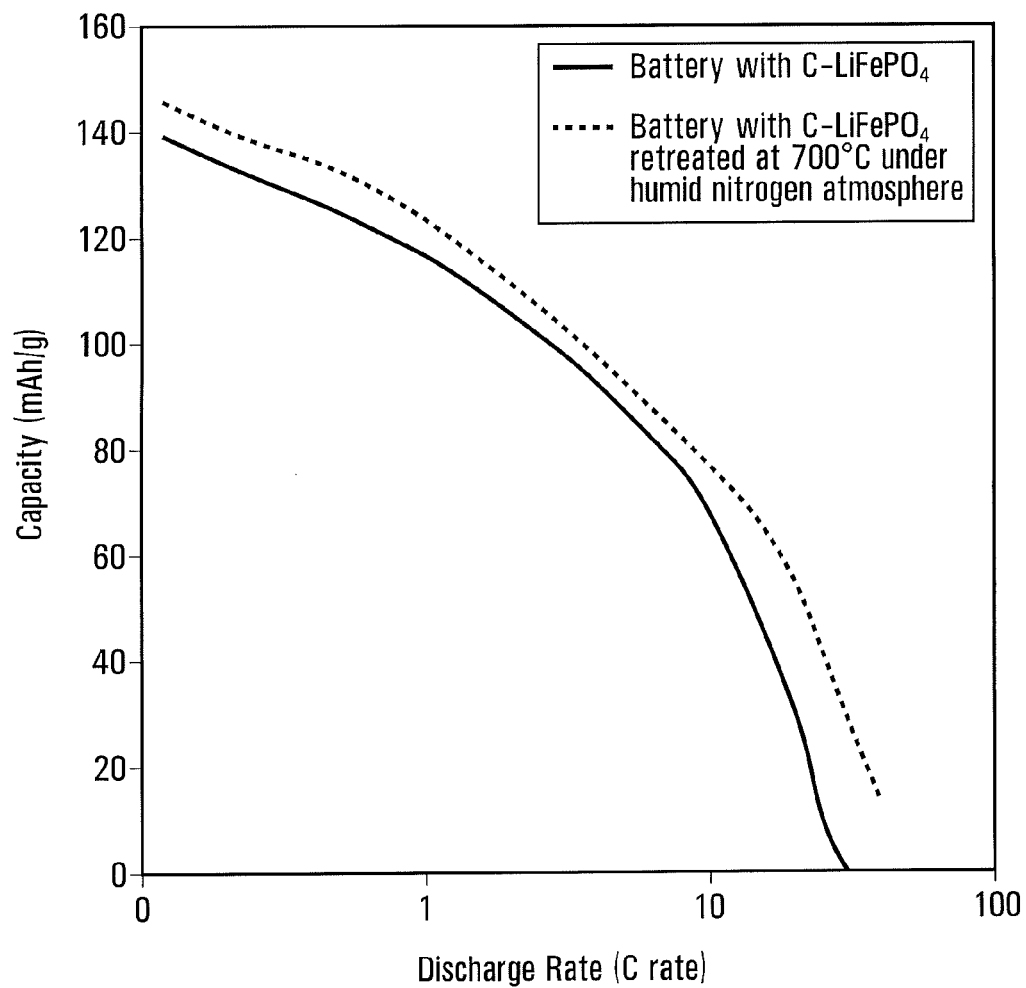
FIG. 2 illustrates influence of retreatment on battery power capability (ragone plot), determined at room temperature, for two A and B Li/1M $LiPF_6$ EC:DEC 3:7/C—$LiFePO_4$ batteries. Capacity (in mAh/g) is indicated on Y axis and discharge rate (C rate; a 1C rate corresponding to discharge of full capacity in 1 hour) is indicated on X axis, initial capacity is determined by slow-scan voltammetry. Battery B has been prepared with a positive electrode containing C—$LiFePO_4$ (BTR New Energy Materials, grade MAC-P198-C) retreated at 700° C. under a humid nitrogen atmosphere (BTR-R obtained in example 4), battery A with BTR C—$LiFePO_4$ without retreatment (BTR). Retreatment by humid nitrogen improves power capability.
Figure 3:
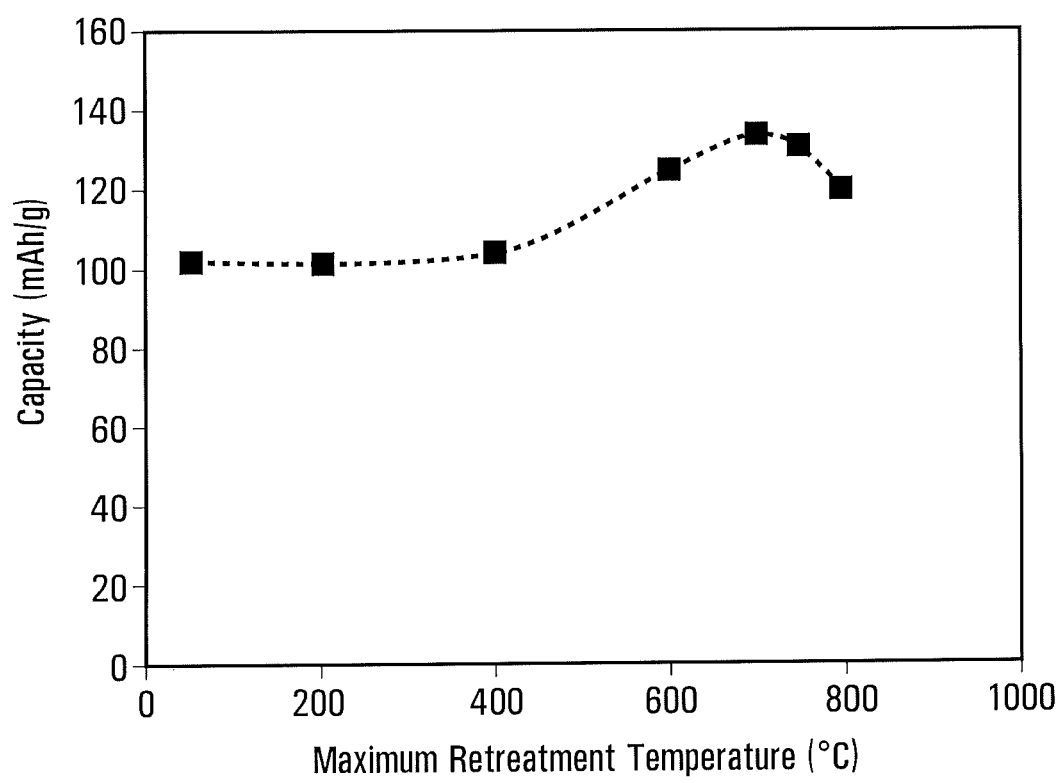
FIG. 3 illustrates influence of retreatment temperature on cathode capacity (mAh/g), for seven (7) batteries (Li/1M $LiPF_6$ EC:DEC 3:7/C—$LiFePO_4$, room temperature, C/10 discharge rate, $1^{st}$ cycle) with cathode materials obtained in example 8 (C—$LiFePO_4$-3-RK-$WT_{max}$, $T_{max}$ of 50, 200, 400, 600, 700, 750 and 800° C.) retreated under humid nitrogen at $T_{max}$ for 2 hours. Retreatment by humid nitrogen improves capacity (mAh/g), up to 135 mAh/g from an initial capacity of 102 mAh/g without retreatment.
Figure 4:
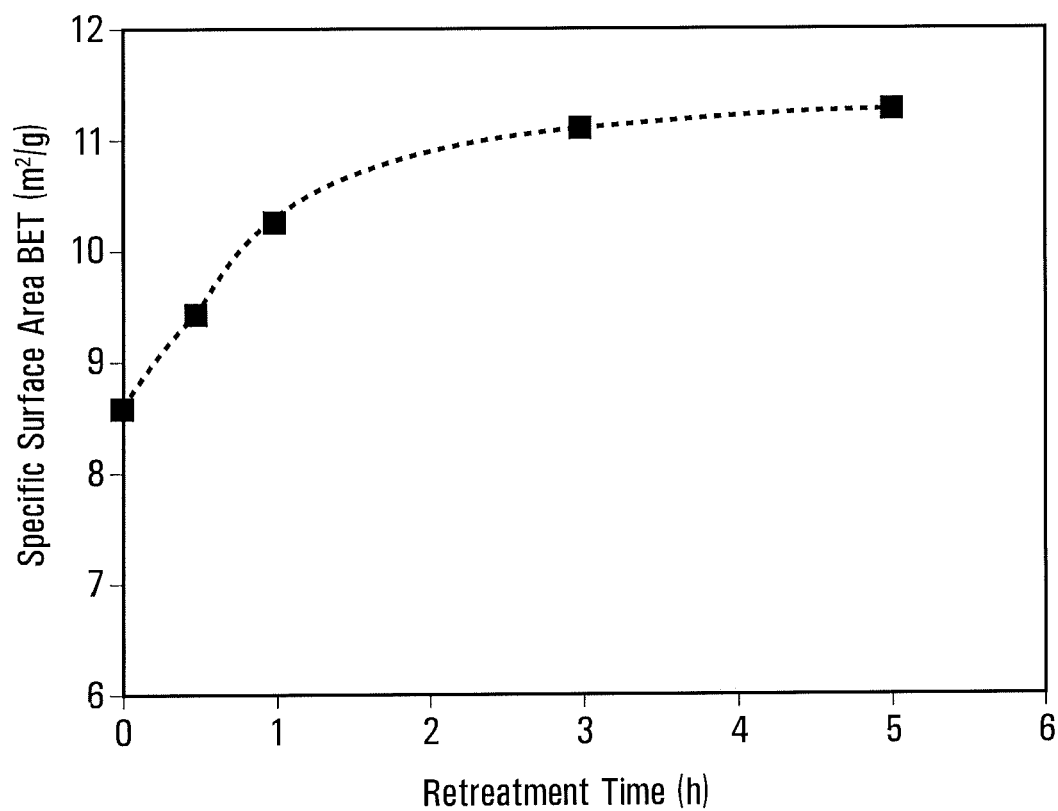
FIG. 4 illustrates influence of retreatment time on specific surface area (BET in $m^2/g$), measured with a Micromeritics Tristar 3020, of C—$LiFePO_4$-9-RK (BET 8.6 $m^2/g$) cathode material obtained in example 9, for four (4) samples (C—$LiFePO_4$-9-RK—W-t-700, t of 0.5, 1, 3 and 5 hours) retreated under humid nitrogen at 700° C. for t hours.
Figure 5:
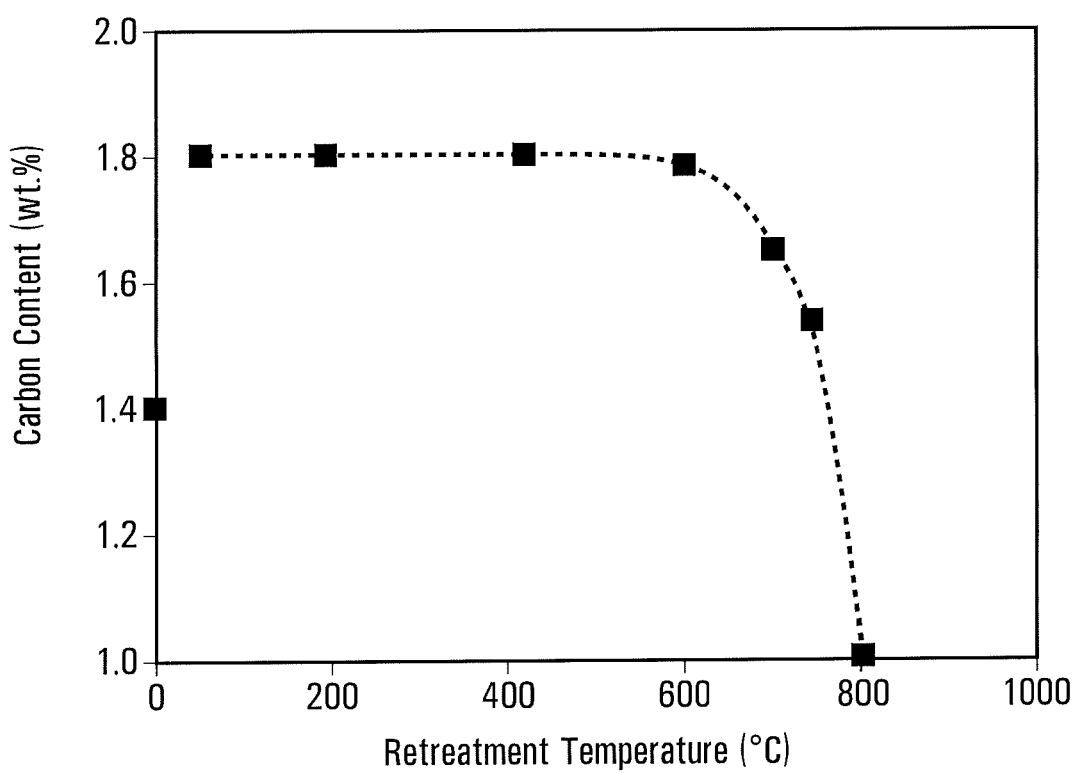
FIG. 5 illustrates influence of retreatment temperature on carbon content (wt. %), measured with a LECO apparatus, of C—$LiFePO_4$-3-RK (carbon content 1.8 wt. %) retreated samples disclosed in FIG. 3.
Figure 6:
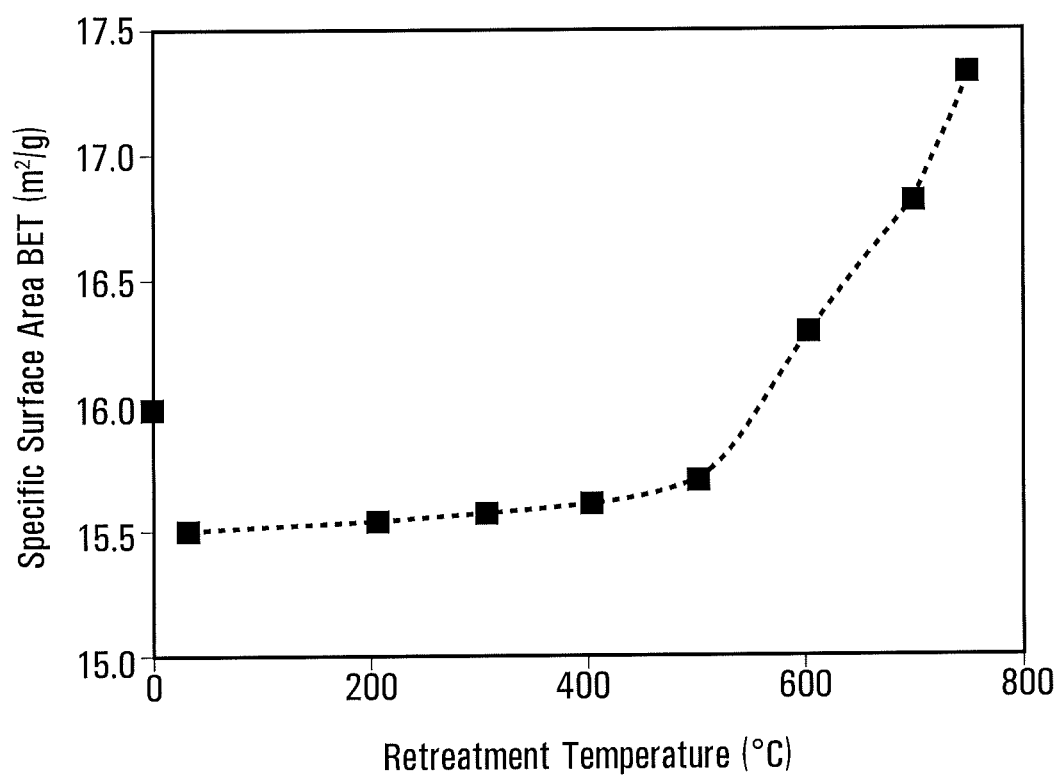
FIG. 6 illustrates influence of retreatment temperature on specific surface area (BET in $m^2/g$), measured with a Micromeritics Tristar 3020, of C—$LiFePO_4$-7-RK (BET 15.5 $m^2/g$) cathode material obtained in example 8, for eight (8) samples (C—$LiFePO_4$-7-RK-$WT_{max}$, $T_{max}$ of 50, 200, 300, 400, 500, 600, 700 and 750° C.) retreated under humid nitrogen at $T_{max}$ for 2 hours.

WO 08/062,111 describes that humidity has deleterious effects on properties of carbon-deposited alkali metal oxyanions, in particular of C—$LiFePO_4$. Surprisingly, and contrarily to expected results, the present inventors have now unexpectedly discovered that carbon-deposited alkali metal oxyanions submitted to a thermal treatment under a humidified atmosphere show improved quality of electrochemical performances.

The present inventors have also discovered that such treatment process could be advantageously operated (i) concomitant to the simultaneous reaction of alkali metal oxyanion precursors together with the step of pyrolysing a carbon precursor, (ii) concomitant to the step of pyrolysing a carbon precursor on previously synthesized alkali metal oxyanions, or (iii) on a previously synthesized alkali metal oxyanions material having a pyrolysed carbon deposit thereon.

In the specific illustrative case of C—$LiFePO_4$, the inventors have found that heat treatment under an atmosphere of $N_2$, $CO_2$, CO or $CO/CO_2$ mixture, did not show any improvement of quality of electrochemical performances of the C—$LiFePO_4$.

The inventors have also found that the effect of the heat treatment under a humidified atmosphere in accordance with the invention is not dependent on the nature of the alkali metal oxyanion, in the sense that the carbon deposit will be modified by the treatment, but the carbon structure could be different due to the different catalytic effect of the different transition metals.

In a specific non-limiting embodiment, the carbon-deposited alkali metal oxyanion of the present invention is described by the general formula $C-A_aM_mM'_{m'}Z_zO_oN_nF_f$ and comprises particles of a compound corresponding to the general formula $A_aM_mM'_{m'}Z_zO_oN_nF_f$ which carry, on at least a portion of their surface, a film of carbon deposited by pyrolysis, the general formula $A_aM_mM'_{m'}Z_zO_oN_nF_f$ being such that:
  A comprises at least one alkaline metal selected from the group consisting of Li, Na and K;
  M comprises at least one transition metal;
  M' comprises at least one non-transition metal;
  Z comprises at least one non-metal selected from the group consisting of S, Se, P, As, Si, Ge and B;
  O is oxygen;
  N is nitrogen and F is fluorine, wherein the latter elements can replace oxygen in the complex oxide since the ionic radii values for $F^-$, $O^{2-}$ and $N^{3-}$ are similar; and
  the coefficients a, m, m', z, o, n and f are chosen independently so as to ensure electroneutrality of the complex oxide, and meet the following conditions:
  $a \geq 0$, $m > 0$, $z \geq 0$, $m' \geq 0$, $o > 0$, $n \geq 0$ and $f \geq 0$.

Several alkali metal oxyanion syntheses are known and are described in publications and patents (See e.g. U.S. Pat. No. 5,910,382, U.S. Pat. No. 6,514,640, US 2005/142056, WO 01/084655, WO 03/077335, WO 03/038930, WO 2008/033672, WO 2009/096255, WO 2010/134579, and WO 2010/120690). Further non-limiting examples of alkali metal oxyanions suitable for the process in accordance with the invention are those of formula $LiFePO_4$, $Li_3Fe_2(PO_4)_3$, $Li_{0.1}FePO_4$, $LiMnPO_4$, $LiFe_{0.7}Mn_{0.03}PO_4$, $LiFe_{0.65}Mn_{0.3}Mg_{0.05}PO_4$, $Li_2FeSiO_4$, $Li_2MnSiO_4$, $Li_4Ti_5O_{12}$, $LiMg_{0.05}Fe_{0.95}PO_4$, $LiVPO_4F$, $Li_3V_2(PO_4)_3$, $LiFeSO_4F$, $Li_{1+x}MP_{1-x}Si_xO_4$, $Li_{1+x-y}MP_{1-x}Si_xO_{4-y}F_y$, $Li_{3-x+z}M_2(P_{1-x-z}S_xSi_zO_4)_3$, $Li_{3+u-x+z}V_{2-z-w}Fe_uTi_w(P_{1-x-z}S_xSi_zO_4)_3$, or $Li_{4+x}Ti_5O_{12}$, $Li_{4+x-2y}Mg_yTi_5O_{12}$, wherein $w \leq 2$; $0 \leq x, y \leq 1$; $z \leq 1$ and M comprises Fe or Mn.

In a non-limiting embodiment, the alkali metal oxyanion comprises sulfates, phosphates, silicates, oxysulfates, oxyphosphates, oxysilicates and mixtures thereof, of a transition metal and lithium, and mixtures thereof. It may also be of interest, for structural stability purposes, to replace partially the transition metal with an element having the same ionic radius but not involved in the redox process, for example, but without being limited thereto, magnesium, aluminum, zirconium, nobium, in concentrations preferably varying between 1 and 25%.

In a 1$^{st}$ specific non-limiting embodiment, the carbon-deposited alkali metal oxyanion of the present invention is described by the general formula $C-A_aM_m(XO_4)_x$ and comprises particles of a compound corresponding to the general formula $A_aM_m(XO_4)_x$ which has an olivine structure and which carry, on at least a portion of their surface, a film of carbon deposited by pyrolysis, the formula $A_aM_m(XO_4)_x$ being such that:
  A represents Li, alone or partially replaced by at most 20% as atoms of Na and/or K, and $0 < a \leq 8$;
  M comprise at least 50% at. of Fe(II), or Mn(II), or mixture thereof, and $1 \leq m \leq 3$; and
  $XO_4$ represents $PO_4$, alone or partially replaced by at most 30 mol % of $SO_4$ or $SiO_4$, and $0 < x \leq 3$; and
  wherein M, X, a, m and x are selected as to maintain electroneutrality of said compound.

In a 2$^{nd}$ specific non-limiting embodiment, the carbon-deposited alkali metal oxyanion of the present invention $C-A_aM_m(XO_4)_x$ comprises particles of a compound corresponding to the general formula $A_aM_m(XO_4)_x$ which has an olivine structure and which carry, on at least a portion of their surface, a film of carbon deposited by pyrolysis, the formula $A_aM_m(XO_4)_x$ being such that:
  A represents Li, alone or partially replaced by at most 10% as atoms of Na or K, and $0 < a \leq 8$;
  M is selected from the group consisting of Fe(II), Mn(II), and mixture thereof, alone or partially replaced by at most 50% as atoms of one or more other metals selected from Ni and Co, and/or by at most 20% as atoms of one or more aliovalent or isovalent metals other than Ni or Co, and/or by at most 5% as atoms of Fe(III), and $1 \leq m \leq 3$; and
  $XO_4$ represents $PO_4$, alone or partially replaced by at most 10 mol % of at least one group chosen from $SO_4$ and $SiO_4$, and $0 < x \leq 3$; and
  wherein M, X, a, m and x are selected as to maintain electroneutrality of said compound.

In a 3$^{rd}$ specific non-limiting embodiment, the carbon-deposited alkali metal oxyanion of the present invention $C-A_aM_m(XO_4)_x$ comprises particles of a compound corresponding to the general formula $A_aM_m(XO_4)_x$ which has an olivine structure and which carry, on at least a portion of their surface, a film of carbon deposited by pyrolysis, the formula $A_aM_m(XO_4)_x$ being such that:
  A represents Li, alone or partially replaced by at most 10% as atoms of Na or K, and $0 < a \leq 8$;
  M is selected from the group consisting of Fe(II), Mn(II), and mixture thereof, alone or partially replaced by at most 50% as atoms of one or more other metals chosen from Ni and Co, and/or by at most 15% as atoms of one or more aliovalent or isovalent metals selected from the group consisting of Mg, Mo, Nb, Ti, Al, Ta, Ge, La, Y, Yb, Cu, Sm, Ce, Hf, Cr, Zr, Bi, Zn, Ca, B and W, and/or by at most 5% as atoms of Fe(III); and $1 \leq m \leq 3$; and
  $XO_4$ represents $PO_4$, alone or partially replaced by at most 10 mol % of $SO_4$ or $SiO_4$, and $0 < x \leq 3$; and
  wherein M, X, a, m and x are selected as to maintain electroneutrality of said compound.

In a 4$^{th}$ specific non-limiting embodiment, the carbon-deposited alkali metal oxyanion of the present invention $C-A_aM_m(XO_4)_x$ comprises particles of a compound corresponding to the general formula $A_aM_m(XO_4)_x$ which has an olivine structure and which carry, on at least a portion of their surface, a film of carbon deposited by pyrolysis, the formula $A_aM_m(XO_4)_x$ being such that
  A represents Li, alone or partially replaced by at most 10% as atoms of Na or K, and $0 < a \leq 8$;
  M is selected from the group consisting of Fe(II), Mn(II), and mixture thereof, alone or partially replaced by at most 10% as atoms of one or more other metals chosen from Ni and Co, and/or by at most 10% as atoms of one or more aliovalent or isovalent metals selected from the group consisting of Mg, Mo, Nb, Ti, Al, Ta, Ge, La, Y, Yb, Cu, Sm, Ce, Hf, Cr, Zr, Bi, Zn, Ca, B and W, and/or by at most 5% as atoms of Fe(III); and $1 \leq m \leq 3$; and
  $XO_4$ represents $PO_4$, alone or partially replaced by at most 10 mol % of at least one group chosen from $SO_4$ and $SiO_4$, and $0 < x \leq 3$; and
  wherein M, X, a, m and x are selected as to maintain electroneutrality of said compound.

In a 5$^{th}$ specific non-limiting embodiment, the carbon-deposited alkali metal oxyanion of the present invention $C-AMXO_4$ is composed of particles of a compound corresponding to the general formula $LiMPO_4$ which has an olivine structure, M comprising at least 90% at. of Fe(II), or Mn(II), or mixture thereof, and which carry, on at least a portion of their surface, a film of carbon deposited by pyrolysis.

In a 6$^{th}$ specific non-limiting embodiment, the carbon-deposited alkali metal oxyanion of the present invention C-AMXO$_4$ is composed of particles of a compound corresponding to the general formula LiFePO$_4$ which has an olivine structure, and which carry, on at least a portion of their surface, a film of carbon deposited by pyrolysis.

In a 7$^{th}$ specific non-limiting embodiment, the carbon-deposited alkali metal oxyanion of the present invention is described by the general formula C-A$_a$M$_m$M'$_{m'}$O$_o$N$_n$F$_f$ and comprises particles of a compound corresponding to the general formula A$_a$M$_m$M'$_{m'}$O$_o$N$_n$F$_f$ which carry, on at least a portion of their surface, a film of carbon deposited by pyrolysis, the general formula A$_a$M$_m$M'$_{m'}$O$_o$N$_n$F$_f$ being such that:

A comprises at least one alkaline metal selected from the group consisting of Li, Na and K;
M comprises solely or mainly Ti;
M' comprises at least one non-transition metal;
O is oxygen;
N is nitrogen and F is fluorine; and
the coefficients a, m, m', o, n and f are chosen independently so as to ensure electroneutrality of the complex oxide, and meet the following conditions:
a>0, m>0, m'≥0, o>0, n≥0 and f≥0.

In a 8$^{th}$ specific non-limiting embodiment, the carbon-deposited alkali metal oxyanion of the present invention is composed of particles of a compound corresponding to the general formula Li$_4$Ti$_5$O$_{12}$ which has a spinel structure, and which carry, on at least a portion of their surface, a film of carbon deposited by pyrolysis.

By "general formula" one means that the stoichiometry of the material can vary by a few percents from stoichiometry due to substitution or other defects present in the structure, including anti-sites structural defects such as, without any limitation, cation disorder between iron and lithium in LiFePO$_4$ crystal, see for example Maier et al. [Defect Chemistry of LiFePO$_4$, Journal of the Electrochemical Society, 155, 4, A339-A344, 2008] et Nazar et al. [Proof of Supervalent Doping in Olivine LiFePO$_4$, Chemistry of Materials, 2008, 20 (20), 6313-6315].

The deposit of carbon can be present as a more or less uniform, adherent and non-powdery deposit. It represents up to 15% by weight, preferably from 0.5 to 5% by weight, with respect to the total weight of the material. Methods to produce complex metal oxyanion, in particular A$_a$M$_m$(XO$_4$)$_x$ and/or C-A$_a$M$_m$(XO$_4$)$_x$ compounds are well known. They can be obtained, for example but without being limited thereto, via a hydrothermal route, via a solid-state thermal route, via a sol-gel route or via a melt casting route. Deposition of carbon by pyrolysis of an organic carbon precursor could be performed on complex metal oxyanion, in particular A$_a$M$_m$(XO$_4$)$_x$ or its precursors.

In accordance with a specific non-limiting embodiment, carbon-deposited alkali metal oxyanion material may be composed of individual particles and/or agglomerates of individual particles. The size of the individual particles is preferably between 10 nm and 3 μm. The size of the agglomerates is preferably between 100 nm and 30 μm.

In accordance with a specific non-limiting embodiment, carbon-deposited alkali metal oxyanion material is composed of agglomerates (also known as "secondary particles") with a 0.5 μm≤D$_{50}$≤10 μm.

In accordance with a specific non-limiting embodiment, carbon-deposited alkali metal oxyanion material is composed of secondary particles with a D$_{90}$≤30 μm.

In accordance with a specific non-limiting embodiment, carbon-deposited alkali metal oxyanion is in particulate form or agglomerate of nanoscaled particles, and the deposit of carbon on C-A$_a$M$_m$(XO$_4$)$_x$ is deposited on the surface of the particles or inside agglomerate of the nanoscaled particles.

In accordance with a specific non-limiting implementation, it could be advantageous to operate the process of the present invention on mixture of different grades of carbon-deposited alkali metal oxyanion, such as material with different particle size distribution, for example, without any limitation, a mixture comprising at least one submicron-sized (having less than about 1 micron) carbon-deposited alkali metal oxyanion and at least one micron-sized (having more than about 1 micron) carbon-deposited alkali metal oxyanion. Such mixture may allow cathode optimization in terms of energy and power density.

In a specific non-limiting embodiment, when we refer herein to the cathode material being used as cathode in a lithium battery, the lithium battery can be, for example but without being limited thereto, a solid electrolyte battery in which the electrolyte can be a plasticized or non-plasticized polymer electrolyte, a battery in which a liquid electrolyte is supported by a porous separator, or a battery in which the electrolyte is a gel.

In a broad non-limiting implementation, the process of the invention is performed in a chemical reactor under a humidified atmosphere. The humidified atmosphere includes a humidified gas. In one non-limiting embodiment, the humidified atmosphere includes water steam. Humidified gases are routinely obtained by the person skilled in the art. In one non-limiting embodiment, the humidified gas is conveniently obtained by bubbling a gas in water. The person skilled in the art will readily understand that the temperature of the water may be varied such as to allow control of the level of humidity in the gas. The person skill in the art will also be able to identify suitable alternative ways of generating a humid atmosphere without undue effort and without departing from the present invention.

Humidified atmosphere could be adapted to the chemical nature of the carbon-deposited alkali metal oxyanion electrode material. For example, LiFePO$_4$ is sensitive to oxidative atmosphere but LiMnPO$_4$ or Li$_4$Ti$_5$O$_{12}$ could be produced under air. The present invention should be conducted nevertheless in reduced oxygen partial pressure to avoid direct carbon combustion by oxygen.

Accordingly, in one non-limiting embodiment, the humidified gas is, without any limitation, a humidified inert gas (nitrogen, argon, helium, etc.), humidified reducing gas (H$_2$, CO), humidified CO$_2$, humidified NH$_3$.

In a broad non-limiting implementation, the process of the invention is performed in a chemical reactor allowing the control of the atmosphere and of the heat treatment temperature.

In a broad non-limiting implementation, at laboratory scale, the process of the invention is conveniently operated in a tubular furnace or an airtight metallic container placed into a furnace, both with a gas inlet and outlet allowing control of the atmosphere in contact with the carbon-deposited alkali metal oxyanion or its precursors.

In a broad non-limiting implementation, at industrial scale, the process of the invention is preferably carried out continuously, preferably in a reactor that promotes the equilibrium of solid powders, agglomerated or not, with the gaseous phase, e.g. from among those reactors, rotary kilns, push kilns, fluidized beds, belt-driven kilns, that allow control of the composition and the circulation of the gaseous atmosphere. Utilization of large batch kiln, such as baking kiln, is not excluded.

In a broad non-limiting implementation, the duration time of the process of the invention is chosen as a function of the nature of the carbon-deposited alkali metal oxyanion or its precursors and other parameters, such as reasonable time-constraints. In one embodiment, the duration time of the heat treatment under humidified atmosphere is from about 10 minutes to about 10 hours, preferably from about 20 minutes to about 2 hours, most preferably from about 1 hour to about 3 hours. The person skill in the art will be able to identify suitable alternative heat treatment under humidified atmosphere duration time without undue effort and without departing from the present invention. The inventors have discovered that the carbon-deposited content and carbon-deposited morphology change with the process of the invention, which results in changes in specific surface area of the carbon-deposited alkali metal oxyanion. For a given specific chemical reactor equipment, the changes in carbon-deposited content and specific surface area may depend on the treatment temperature, treatment duration time, moisture concentration in the gaseous atmosphere and the nature of the carbon-deposited complex metal oxyanion. However, the person skill in the art will be able to adapt the teaching described herein in order to improve the electrochemical performance of a given alkali metal oxyanion, modifying if required and without undue effort, parameters such as treatment temperature, treatment duration time, moisture concentration in the gaseous atmosphere, etc., without departing from the present invention. To this effect, the inventors have successfully scaled-up the process of the invention from laboratory scale (about 10 to 100 grams batch process) to industrial scale in a rotary kiln (about 5 to 15 kg/hour continuous process) without undue effort.

In a non-limiting illustrative implementation, at laboratory and industrial scale, the process of the present invention has, for example and without being limited thereto, allowed to improve electrochemical performances of previously synthesized off-specification C—LiFePO$_4$ commercial lots. More specifically, to improve specific electrochemical capacity (mAh/g), determined at a low discharge rate of C/12, of a dozen of C—LiFePO$_4$ commercial lots, ranging from 119 to 136 mAh/g to a minimum value of about 140 mAh/g with a medium value of 143 mAh/g.

Available industrial equipment can also be adapted to perform the process of the invention. In a non-limiting implementation, the inventors successfully adapted an industrial rotary kiln of an about 1 m$^3$ volume and having a temperature ramping up to 750° C. along the length of the kiln, to receive a tube in which the inventors injected humidified atmosphere in a zone where the temperature was about 700° C. In this specific chemical reactor, the process in accordance with the invention has been conveniently, and without undue effort, adapted to different off-specification lot of C—LiFePO$_4$ each needing optimized conditions to improve their specific electrochemical capacity (mAh/g) in accordance with required specification, as per the following. A feed rate of 7 kg/hour of C—LiFePO$_4$ was injected in the zone (having the temperature of about 700° C.): for a lot of C—LiFePO$_4$ needing more stringent retreatment conditions, the required humidified atmosphere was obtained by injecting 3.4 m$^3$/hour of nitrogen previously bubbled in water at 45° C.; whereas for a lot of C—LiFePO$_4$ needing less intensive retreatment conditions, the required humidified atmosphere was obtained by injecting 2.3 m$^3$/hour of nitrogen previously bubbled in water at 25° C.

In these two non-limiting examples, convenient adaptation, without undue effort, of flow and water-content of humidified atmosphere in accordance with the invention have allowed to efficiently improve electrochemical performances of different off-specification lots of C—LiFePO$_4$.

In a broad non-limiting implementation of the invention, the heat treatment under humidified atmosphere could be operated during a one-step or a multi-step process. In one non-limiting embodiment, synthesis of carbon-deposited alkali metal oxyanion could be done in a first rotary kiln whereas the heat treatment under a humidified atmosphere could be done in a second contiguous kiln. By extension, a multi-step process also includes the non-limiting embodiment where a specific zone in one kiln can be used to perform synthesis and another zone in the same kiln can be used for the heat treatment under humidified atmosphere. For example, reactants could be fed at one side of the kiln and heat treatment under humidified atmosphere at the other side of the kiln. In one non-limiting embodiment, the kiln used to perform the present invention can be, without limitation, a rotary kiln, or a push kiln, or a belt kiln, as long as solid-gas exchanges are possible. In one non-limiting embodiment, for heat treatment under humidified atmosphere, a fluidized bed can be used to homogenize the contact of moisture gas with solid powders.

A multi-step process could be operated in a single chemical reactor, for example industrial pusher kiln manufactured by Noritake Co. (Japan) provided opportunity to use special atmosphere along the kiln. In this case, atmosphere is controlled by implementation of multiple inlet/outlet of gas along the kiln and presence of mechanical barrier limiting gas exchange between such define zone, thus such kiln could be operated as a "multi-zone" kiln.

In a specific embodiment, process of the present invention is preferably operated on a previously synthesized carbon-deposited alkali metal oxyanion, this includes case where humidified atmosphere is injected in a chemical reactor wherein carbon-deposited alkali metal phosphate is already formed from precursors.

In a preferred embodiment, process of the present invention is preferably operated on a micron-sized carbon-deposited alkali metal phosphate electrode C-AMPO$_4$, wherein M comprises at least 90% at. of Fe(II) or Mn(II) or mixture thereof, wherein A represents Li, alone or partially replaced by at most 10% as atoms of Na or K, and wherein the carbon deposit is obtained by pyrolysis of an organic compound; the expression "micron-sized compound" encompasses C-AMPO$_4$ with AMPO$_4$ primary particles size distribution such as D$_{50}$ is comprised between 1 and 5 μm, and such as C-AMPO$_4$ secondary D$_{50}$ particles size distribution is comprised between 1 and 10 μm.

Inventors have also put in evidence that the process of the invention is of particular use in the preparation of micron-sized carbon-deposited alkali metal oxyanion, wherein process of synthesis includes at least one solid-state high-energy milling of the precursors and wherein thermal treatment operated under humidified atmosphere is done after synthesis of carbon-deposited alkali metal oxyanion, including case where humidified atmosphere is injected in a chemical reactor wherein carbon-deposited alkali metal phosphate is already formed from precursors.

In a specific embodiment, micron-sized carbon-deposited alkali metal oxyanion, wherein process of synthesis includes at least one solid-state high-energy milling of the precursors, is C-AMPO$_4$, wherein M comprises at least 90% at. of Fe(II) or Mn(II) or mixture thereof, wherein A represents Li, alone or partially replaced by at most 10% as atoms of Na or K, and wherein the carbon deposit is obtained by pyrolysis of an organic compound.

In a more specific embodiment, the deposit of carbon in those C-AMPO$_4$ cathode material, represents about 1.5% to about 3% by weight, with respect to the total weight of the material and characterized in that after thermal treatment operated under humidified atmosphere aforementioned content of carbon deposit is reduced by about 5% to about 30%, preferably by about 5% to about 20%, and more preferably by about 5% to 15%.

Without wishing to be bound by theory, it is believed that heat treatment under a humidified atmosphere induces an optimization of carbon-coating by eliminating some fluffy carbon formed during pyrolysis (xerogel) and improves porosity of cathode material. Such fluffy carbon, eventually not in direct contact with the electrode material, is left at least partially amorphous which could in particular limit access of electrolyte with the surface of carbon-deposited alkali metal oxyanion, even in limited quantity due to their morphology akin to xerogel. Such fluffy carbon could also eventually present a limited electronic conductivity. In short, it is possible to consider, without wishing to be bound by theory, that the invention eliminates fluffy carbon to leave only thin conductive carbon deposit at or close to the surface of the electrode material.

Without wishing to be bound by theory, as it is recognized that pyrolitic carbon deposit could be only partially graphitized, it is believed that process of the invention preferentially affect at least a part of non-graphitized carbon more sensitive to consumption under thermal treatment operated under a humidified atmosphere, resulting in electrochemical performances improvement.

At temperatures higher than about 800° C., it is believed that the carbon burning off is accelerated, therefore, a shorter heat treatment duration time or less concentration of moisture in the humidified atmosphere should be required, since too much carbon reduction will lead to significant particle sintering and decrease of the performance of the cathode material. The person skill in the art will be able to identify suitable heat treatment duration time or concentration of moisture in the humidified atmosphere without undue effort and without departing from the present invention.

It is also believed that the presence of the less conductive fluffy carbon, formed by pyrolyzing organic precursors on carbon-deposited complex metal oxyanion, above a given amount may result in low packing density and reduced lithium ion transport through the thick carbon layer. The inventors have discovered that the process of the invention reduces carbon content and increase specific surface area (BET). In other words, the BET/C ratio increases, and the electrochemical performance improves.

The electrochemical performance of the carbon-deposited alkali metal oxyanion may depend on the particle size, phase purity and the carbon nature. In most cases, the person skilled in the art may be able to control the consistency in phase purity and particle size, but the performance of the resulting product may still fluctuate in a wide range due to differences in the carbon and surface properties. In a broad non-limiting implementation of the invention, heat treatment under a humidified atmosphere can significantly improve the performance of low capacity materials (assuming good phase purity and reasonable particle size), and therefore, heat treatment under a humidified atmosphere of various batches of materials can significantly improve product consistency.

In accordance with a specific implementation, the carbon-deposited alkali metal oxyanion material may comprise at its surface or in the bulk, additives, such as, without any limitation, carbon particles, carbon fibers and nanofibers, carbon nanotubes, graphene, metallic oxides, and mixture thereof.

Details of the invention will be further described in the following illustrative and non-limiting embodiment examples.

Comparative Example 1

Synthesis of C—LiFePO$_4$ in a Rotary Kiln

A mixture comprising micron sized FePO$_4$.2H$_2$O (500 moles, sold by Budenheim, grade E53-81), Li$_2$CO$_3$ (250 moles, sold by Limtech, level of purity: 99.9%) and 5 wt. % of polyethylene-block-poly(ethylene glycol) comprising 50% of ethylene oxide (sold by Aldrich) was prepared and wetted by isopropyl alcohol (200 liters), mixing was carried out for approximately 2 hours and then the solvent was removed. In the beads thus obtained, the polymer keeps together the particles of phosphate and carbonate.

After drying, the mixture was introduced in a rotary kiln at a feed rate of 10 kg/h and heat up to 700° C. at the rate of 6° C. per minute. This temperature was maintained for one hour and then the sample was cooled over 40 minutes, i.e. with a cooling rate of approximately 15° C. per minute. The kiln was maintained under flushing with nitrogen throughout the duration of the heat treatment.

This procedure was repeated with ten (10) different batches of Budenheim FePO$_4$.2H$_2$O grade E53-81, and synthesized products named as C—LiFePO$_4$—X-700-RK ($1 \leq X \leq 10$).

Comparative Example 2

Synthesis of C—LiFe$_{0.9}$Mn$_{0.1}$PO$_4$ in a Rotary Kiln

C—LiFe$_{0.9}$Mn$_{0.1}$PO$_4$ was synthesized as described in example 1, by using a mixture of FePO$_4$.2H$_2$O (450 moles) and MnHPO$_4$.1.25H$_2$O (50 moles, sold by Barker Industries Inc.) instead of the 500 moles FePO$_4$.2H$_2$O.

Material was then cooked in a rotary kiln as described in comparative example 1. This procedure was repeated with ten (10) different batches of Budenheim FePO$_4$.2H$_2$O grade E53-81, and synthesized products named as C—LiFeMnPO$_4$—X—RK ($1 \leq X \leq 10$).

Comparative Example 3

Synthesis of C—LiFe$_{0.97}$Mg$_{0.03}$PO$_4$ in a Rotary Kiln

C—LiFe$_{0.97}$Mg$_{0.03}$PO$_4$ was synthesized as described in example 1, by using a mixture of FePO$_4$.2H$_2$O (485 moles) and MgHPO$_4$ (15 moles, sold by Aldrich) instead of the 500 moles FePO$_4$.2H$_2$O.

Material was then cooked in a rotary kiln as described in comparative example 1. This procedure was repeated with ten (10) different batches of Budenheim FePO$_4$.2H$_2$O grade E53-81, and synthesized products named as C—LiFeMgPO$_4$—X—RK ($1 \leq X \leq 10$).

Comparative Example 4

Synthesis of C—LiFePO$_4$ in a Laboratory Furnace

A mixture comprising FePO$_4$.2H$_2$O (1 mol, sold by Budenheim, grade E53-81) and Li$_2$CO$_3$ (0.5 mol, sold by Limtech, level of purity: 99.9%) and 5 wt. % of polyethylene-block-poly(ethylene glycol) comprising 50% of ethylene oxide (sold by Aldrich) was prepared and wetted by isopropyl alcohol (400 ml), mixing was carried out for approximately 10 hours and then the solvent was removed.

In an airtight container, placed into a furnace and with a gas inlet and outlet, prepared phosphate/carbonate/polymer mixture in a ceramic crucible was heat up to 700° C. at the rate of 6° C. per minute. This temperature was maintained for one hour and then the sample was cooled over 1 hour. The airtight container was maintained under flushing with dry nitrogen (100 ml/mn) throughout the duration of the heat treatment.

The material, named C—$LiFePO_4$-LF, has a specific surface of 13.6 $m^2$/g and a carbon content of 1.8 wt. %.

Comparative Example 5

Synthesis of C—$LiMnPO_4$ in a Laboratory Furnace

Nanosized $LiMnPO_4$ was prepared by a polyol synthesis as described by Wang et al. (Journal of Power Sources, 189, (2009), pages 624-628). Manganese acetate tetrahydrate (0.6 mole, Acros, 99%) was dissolved into 300 ml deionized water and poured into 200 ml diethylene glycol (DEG, Aldrich, 99%) in a three-neck round-bottom flask. This DEG-$H_2O$ solution was vigorously stirred and heated to over 100° C., kept for 1 hour, and then 300 ml 2 mol/l lithium dihydrogen phosphate ($LiH_2PO_4$, 99%, Aldrich) aqueous solution was dropped into this system with a speed of 1 ml/mn. Finally the DEG suspension was kept for another 4 hours at this temperature. After cooled down to room temperature, the $LiMnPO_4$ material was separated by centrifugation and washed three times with ethanol in order to remove the residual DEG and organic remnants. As a final step the material was dried in an oven at 120° C. overnight.

50 g of nanosized $LiMnPO_4$ is then intimately mixed with 8 g lactose monohydrate (Aldrich) and 20 ml of deionized water and dried overnight under vacuum at 70° C. Product is then broken by hand and coarse-milled in a disc mill (Fritsch Pulverisette 13) with a disc spacing of 1 mm. In an airtight container, placed into a furnace and with a gas inlet and outlet, $LiMnPO_4$/lactose mixture in a ceramic crucible was heat up to 700° C. at the rate of 6° C. per minute. This temperature was maintained for one hour and then the sample was cooled over 1 hour. The airtight container was maintained under flushing with dry nitrogen (100 ml/mn) throughout the duration of the heat treatment.

The material is named C—$LiMnPO_4$-LF.

Comparative Example 6

Synthesis of C—LiFeMPO_4 in a Laboratory Furnace

C—$LiFe_{0.95}M_{0.05}PO_4$ with M=Co, B has been synthesized as in comparative example 4 by using a mixture of $FePO_4.2H_2O$ (0.95 moles) and respectively Co(II) acetate/$NH_4.H_3PO_4$ (0.05 moles each, sold by Aldrich) and $BPO_4$ (0.05 moles) and named respectively as C—$LiFeCoPO_4$-LF and C—$LiFeBPO_4$-LF.

Comparative Example 7

Synthesis of C—$LiFePO_4$ at Lab-Scale with Gas-Phase Coating

C—$LiFePO_4$ was obtained by gas-phase deposition of carbon on $LiFePO_4$ as described by Belharouak & al. (Electrochemistry Communications, 7, (2005), pages 983-988). $LiFePO_4$ was first prepared by a solid-state reaction involving a mixture of iron (II) oxalate dihydrate (1 mol, sold by Aldrich, 99.99%), ammonium dihydrogen phosphate (1 mol, sold by Aldrich, 99.999%), and lithium carbonate (0.5 mol, sold by Limtech, 99.9%). The precursors were mixed overnight by ball milling in acetone. The obtained gel was first dried at 60° C. under vacuum, then thoroughly reground, before being heated under purified $N_2$ gas (99.999%) for 24 h at 700° C. The resulting powder was subsequently coated with a carbon film by feeding a mixture of $N_2$ and propylene, $C_3H_6$, as the carbon source gas into a preheated reactor furnace containing the olivine material. The temperature for decomposing $C_3H_6$ gas and depositing a few monolayers of carbon at the surface of olivine particle was set at 700° C.

The material, named C—$LiFePO_4$-GP, has a specific surface of 8.3 $m^2$/g and a carbon content of 4.2 wt. %.

Comparative Example 8

Powder/Powder Synthesis of C—$LiFePO_4$ in a Rotary Kiln $FePO_4.2H_2O$ (1 mol, sold by Budenheim, grade E53-81), $Li_2CO_3$ (0.5 mol, sold by Limtech, level of purity: 99.9%) and 5 wt. % of micronized polyethylene wax powders (Marcus Oil & Chemical, grade M 5005, average particle size of 5 μm) were mixed during 30 nm in a high shear mixer.

$FePO_4$/$Li_2CO_3$/Marcus mixture was then cooked in a rotary kiln as disclosed in comparative example 1.

The material, named C—$LiFePO_4$—PP—RK, has a carbon content of 2.2 wt. %.

Comparative Example 9

Powder/Powder Synthesis of C—$LiFePO_4$ at Lab-Scale $FePO_4.2H_2O$ (1 mol, sold by Budenheim, grade E53-81), $Li_2CO_3$ (0.5 mol, sold by Limtech, level of purity: 99.9%) and 5 wt. % of micronized polyethylene wax powders (Marcus Oil & Chemical, grade M 5005, average particle size of 5 μm) were high-energy ball milled for 2 hours.

$FePO_4$/$Li_2CO_3$/Marcus mixture was then cooked in an airtight container as disclosed in comparative example 4.

The material, named C—$LiFePO_4$—PP-LF, has a carbon content of 2.2 wt. %.

Example 1

Synthesis of C—$LiFePO_4$ Under Water Vapor in a Laboratory Furnace 10 g phosphate/carbonate/polymer mixture obtained in comparative example 4 was cooked in same airtight container of comparative example 4 and with same heating and cooling rate, except that dry nitrogen gas (100 ml/mn) was bubbled in water at 80° C. before flushing the container, while maintaining sample cooling under dry nitrogen gas.

The material, named C—$LiFePO_4$-LF-W, has a specific surface of 14.5 $m^2$/g and a carbon content of 1.6% by weight.

Example 2

Synthesis of C—$LiFePO_4$ Under Water Vapor in a Laboratory Furnace 10 g phosphate/carbonate/polymer mixture obtained in comparative example 4 was cooked in same airtight container of comparative example 4 and with same heating and cooling rate, except that dry nitrogen gas (100 ml/mn) was bubbled in water at 80° C., before flushing the container, up to temperature reach 700° C., humid nitrogen was then replaced by dry nitrogen for 1 hour at 700° C. and subsequent cooling step.

The material, named C—LiFePO$_4$-LF-W700, has a specific surface of 13.8 m$^2$/g and a carbon content of 1.7% by weight.

A similar example has been done but with shifting of humid nitrogen to dry nitrogen performed at 500° C. The material, named C—LiFePO$_4$-LF-W500, has a specific surface of 13.8 m$^2$/g and a carbon content of 1.7% by weight.

Example 3

Synthesis of C—LiFePO$_4$ Under Water Vapor in a Laboratory Furnace 10 g phosphate/carbonate/polymer mixture obtained in comparative example 4 was cooked in same airtight container of comparative example 4 and with same heating and cooling rate, except that when temperature reach 700° C., dry nitrogen gas flow (100 ml/mn) was replaced during one hour by nitrogen gas flow (100 ml/mn) bubbled in water (80° C.) before flushing, while maintaining sample cooling under dry nitrogen gas.

The material, named C—LiFePO$_4$-LF-700W, has a specific surface of 14.6 m$^2$/g and a carbon content of 1.7% by weight.

A similar example has been done but with shifting of dry nitrogen to humid nitrogen performed at 500° C. This material is named C—LiFePO$_4$-LF-500W.

Such experiments are representative of synthesis performed in a continuous industrial baking kiln, push kiln for example, wherein atmosphere is controlled by implementation of multiple inlet/outlet of gas along the kiln and presence of mechanical barrier limiting gas exchange between such define zone. Such "multizone" push kiln are for example manufactured by Noritake Co. (Japan).

Example 4

Lab-Retreatment of Commercial C—LiFePO$_4$

Several commercial grades of C—LiFePO$_4$ have been retreated under humid atmosphere:

| Manufacturer | Grade | Time (t) | Reference | Name |
|---|---|---|---|---|
| Phostech Lithium | Life Power ™ P1 | 3 h | P1 | P1-R |
| Phostech Lithium | Life Power ™ P2 | 2 h | P2 | P2-R |
| BTR Energy Materials | MAC-P198-C | 3 h | BTR | BTR-R |
| STL Tianjin | PD60 | 3 h | STL | STL-R |
| Tatung Fine Chemicals | Standard | 3 h | Tatung | Tatung-R |

For each samples (P1, P2, BTR, STL, Tatung), in an airtight container, placed into a furnace and with a gas inlet and outlet, 20 g of C—LiFePO$_4$ in a ceramic crucible was heat up to 700° C. in 1 hour under flushing of dry nitrogen (100 ml/mn), then when temperature reach 700° C., dry nitrogen gas flow (100 ml/mn) was replaced by nitrogen gas (100 ml/mn) bubbled in water (80° C.) before flushing for t hours as indicated in table above. Then the sample was cooled from 700° C. over 40 minutes under dry nitrogen gas flow.

Thus was obtained retreated commercial C—LiFePO$_4$ designed as P1-R, P2-R, BTR-R, STR-R, and Tatung-R.

Figure 7:
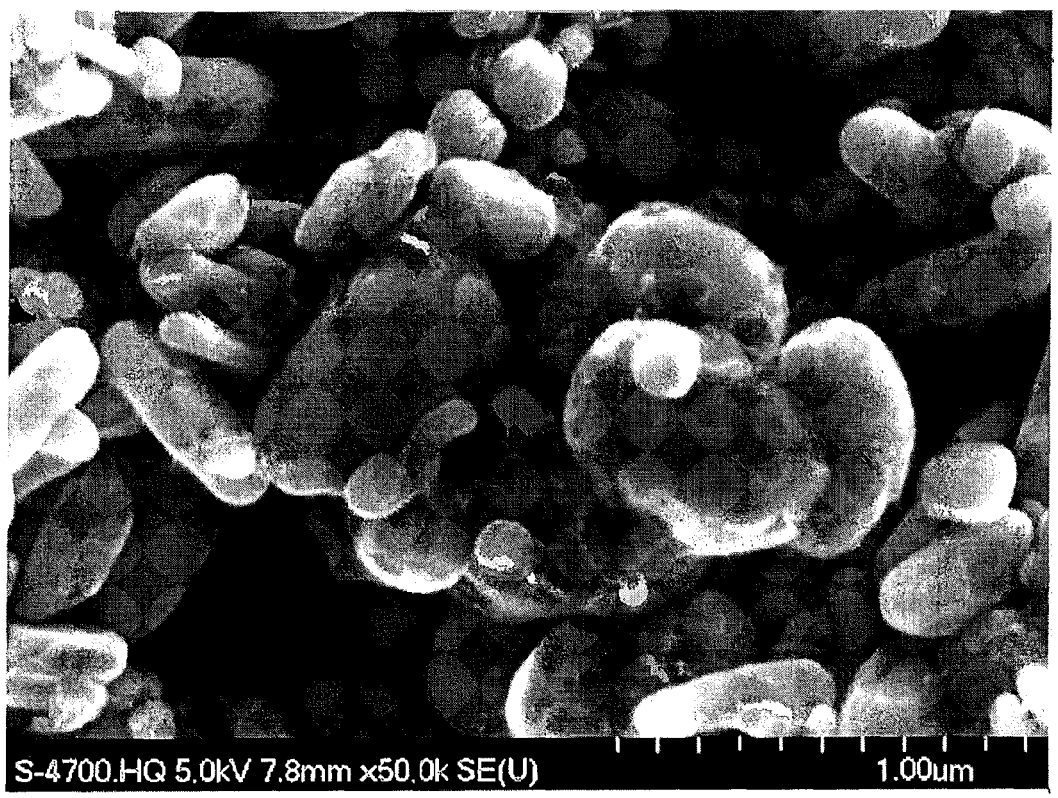
FIGS. 7 & 8 illustrate influence of retreatment on Life Power™ P2 surface observed by SEM microscopy. Comparatively to as-received P2 sample (FIG. 7), fluffy carbon generated during pyrolysis of organic carbon precursor was significantly removed in P2-R as obtained in example 4 (FIG. 8).
Figure 8:
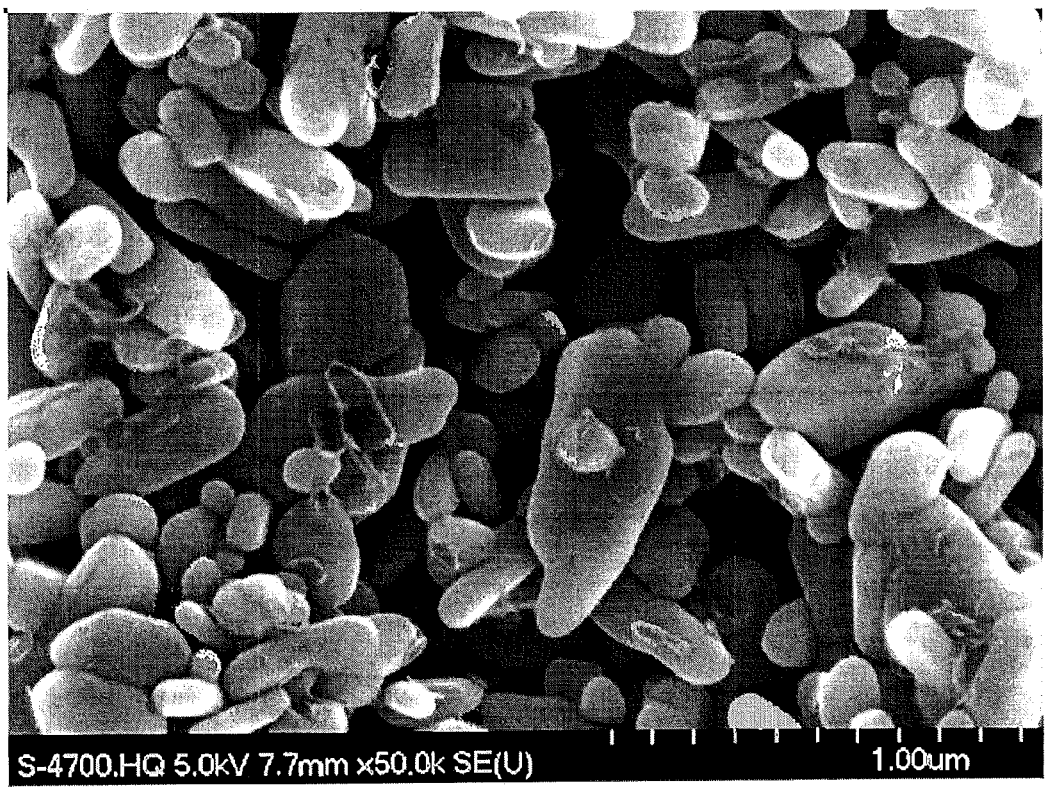
Figure 9:
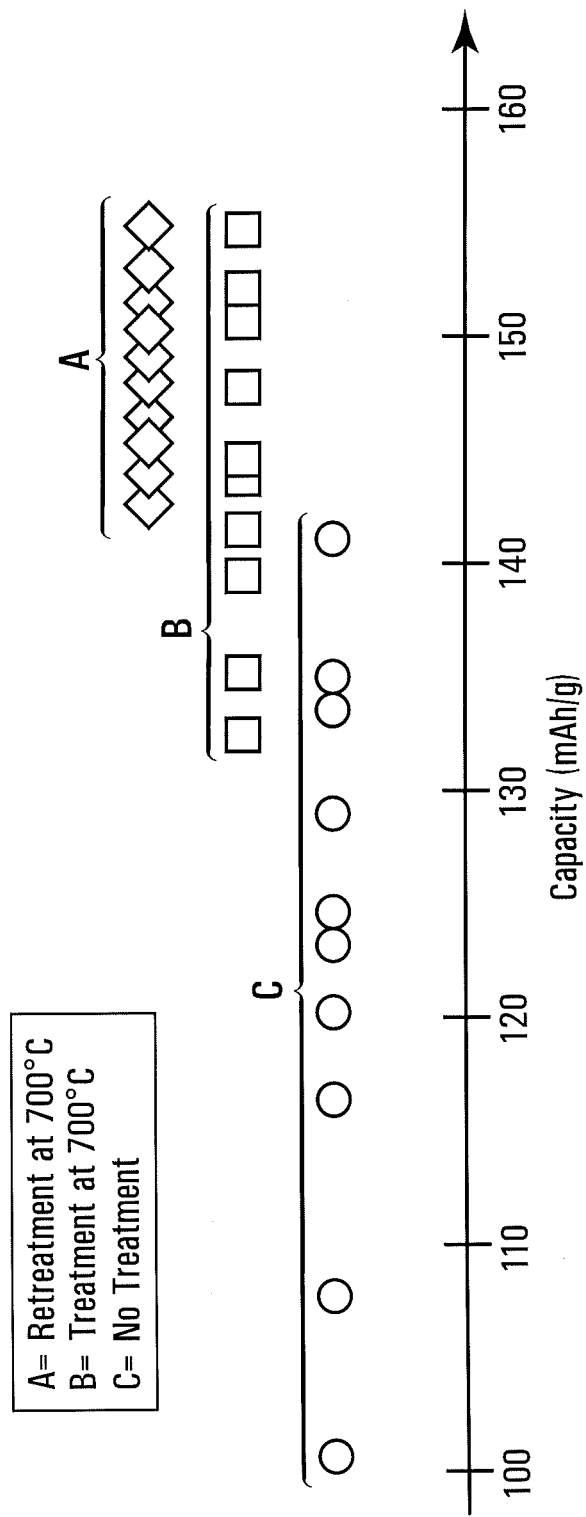
FIG. 9 illustrates distribution of cathode capacity (mAh/g), synthesized in a rotary kiln, for thirty (30) batteries (Li/1M $LiPF_6$ EC:DEC 3:7/C—$LiFePO_4$, room temperature, C/10 discharge rate, $1^{st}$ cycle) with cathode material obtained from each samples of comparative example 1 (C—$LiFePO_4$—X-700-RK, 1≤X≤10, no retreatment, data "C"), of example 10 (C—$LiFePO_4$—X—RK—W700, 1≤X≤10, treatment under humid nitrogen at 700° C., data "B") and of example 11 (C—$LiFePO_4$—X—RK-700-2S, 1≤X≤10, retreatment under humid nitrogen in a dual rotary kiln at 700° C., data "A"). Treatment (data "B") or retreatment (data "A") with humid nitrogen at 700° C., increase C—$LiFePO_4$ consistency and mean electrochemical capacity.
Figure 10:
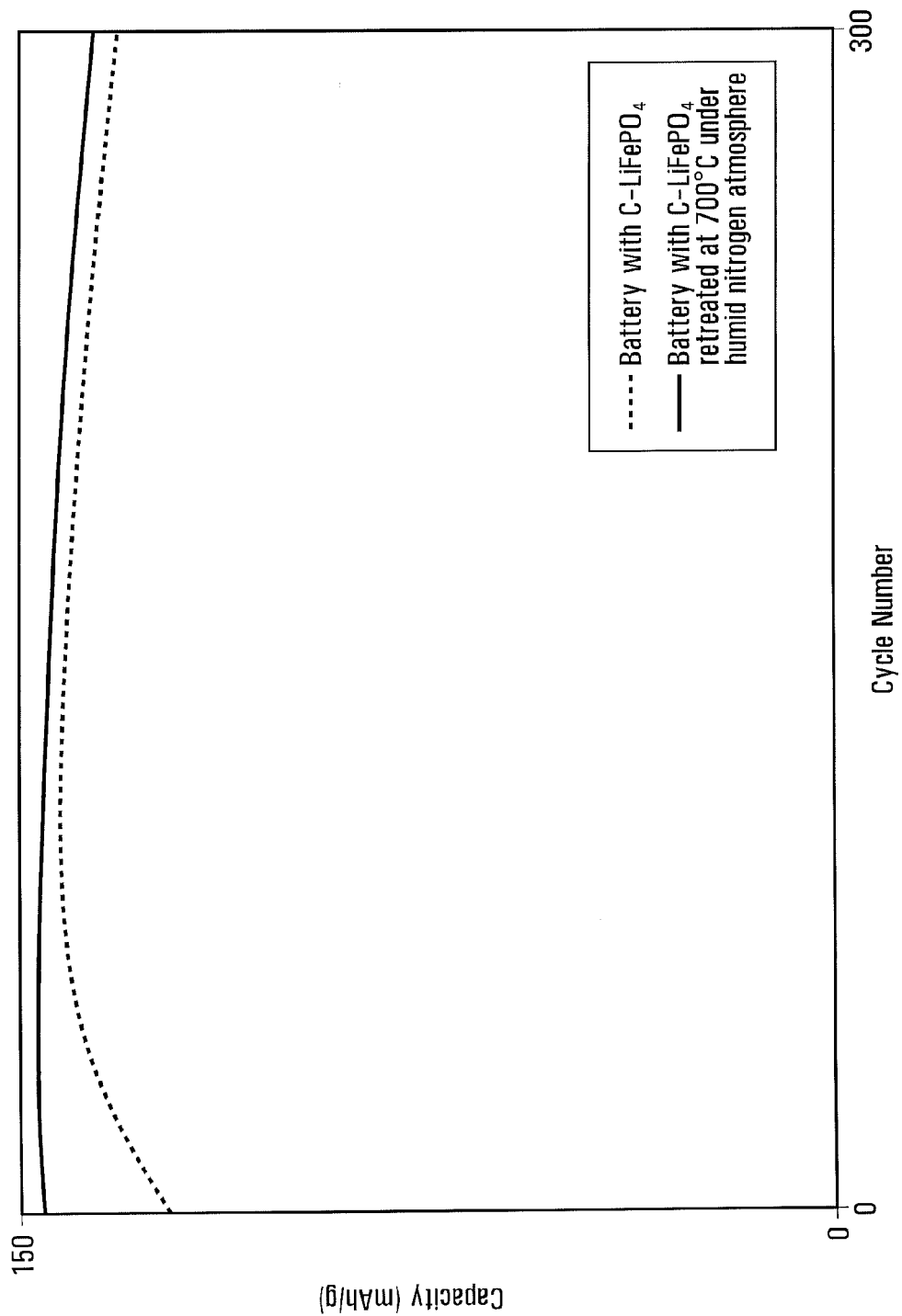
FIG. 10 illustrates cycling capability of cathode material, after and before retreatment, determined at room temperature and C/10 charge/discharge rate, for two A and B Carbon/1M $LiPF_6$ EC:DEC 1:1/C—$LiFePO_4$ lithium ion batteries. Battery capacity (in mAh/g) is indicated on Y axis and cycle number is indicated on X axis. Battery A has been prepared with a positive electrode containing C—$LiFePO_4$ retreated at 700° C. under a humid nitrogen atmosphere (C—$LiFePO_4$—PP-LF-RW700 obtained in example 5), battery B with C—$LiFePO_4$ without retreatment (C—$LiFePO_4$—PP-LF obtained in comparative example 9). In addition to improve capacity and consistency of cathode material, retreatment reduce activation of cathode material.
Figure 11:
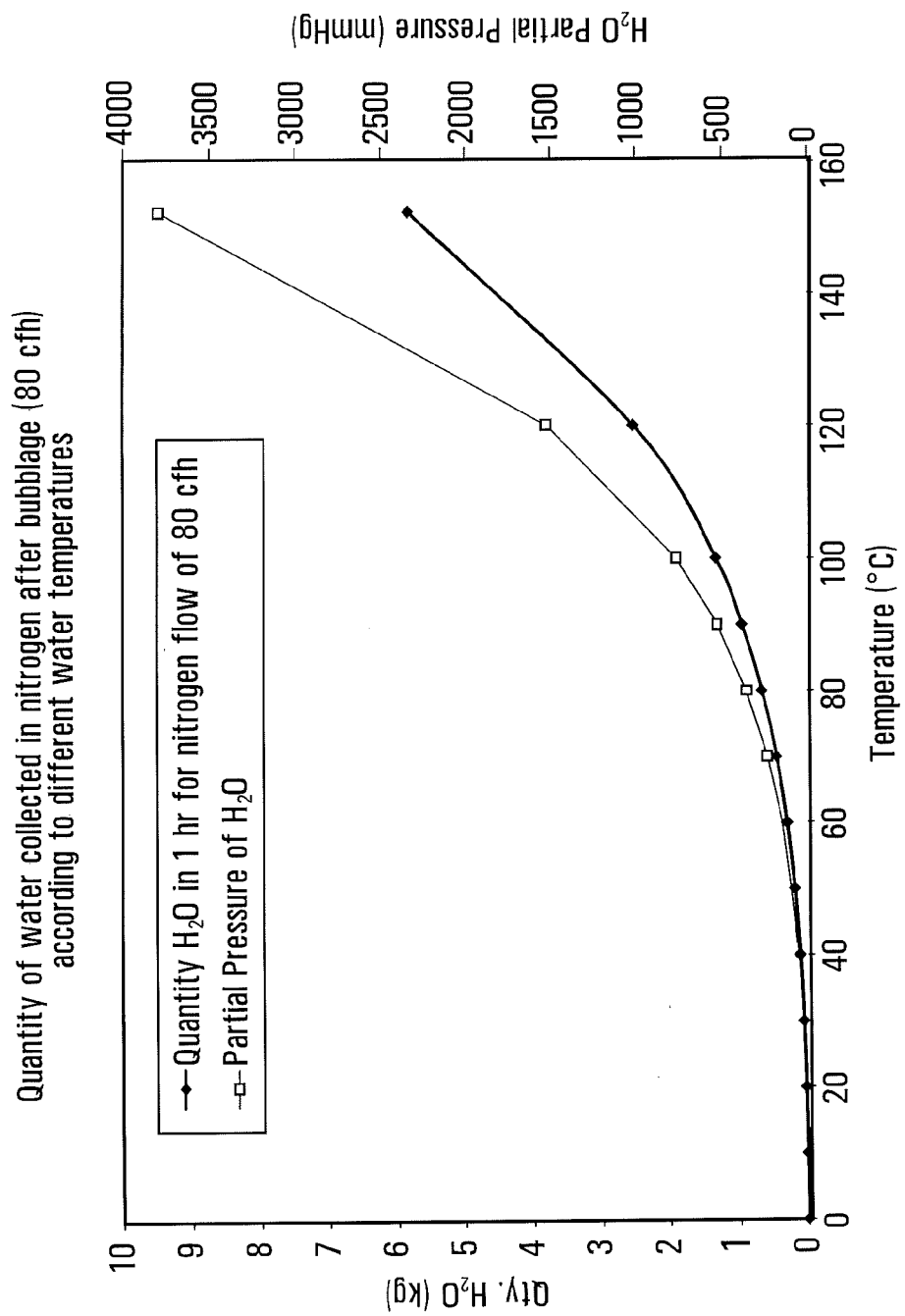
FIG. 11 illustrates quantity of water collected in nitrogen after bubblage (80 cfh) according to different water temperatures.

As shown on SEM picture of Life Power™ P2 product before (P2, See FIG. 7) and after retreatment (P2-R, See FIG. 8), fluffy carbon present in as-received P2 was almost removed in P2-R. The carbon content of the as-received material is 2.4 wt. %, after 2 hours humid atmosphere retreatment, the carbon content is 2.25 wt. %. It is further reduced to 1.45 wt. % and 0.81 wt. % if retreatment is performed at 750° C. and 800° C. instead of 700° C.

Example 5

Lab-Retreatment of Laboratory Synthesized C—LiFePO$_4$

C—LiFePO$_4$-LF obtained in comparative example 4 was retreated as in example 4 at 700° C. for 2 hours under humid nitrogen. The material, named C—LiFePO$_4$-LF-RW700, has a specific surface of 14.5 m$^2$/g and a carbon content of 1.6% by weight.

A similar experiment has been performed by retreatment of C—LiFePO$_4$—PP-LF (obtained in comparative example 9) with humid nitrogen at 700° C. for 2 hours to obtain C—LiFePO$_4$—PP-LF-RW700 cathode material.

Example 6

Lab-Retreatment of C—LiFePO$_4$ Under Various Atmosphere

Samples of C—LiFePO$_4$-LF obtained in comparative example 4 were retreated under various atmosphere. In an airtight container, placed into a furnace and with a gas inlet and outlet, 10 g of C—LiFePO$_4$-LF in a ceramic crucible was heated up to 700° C. in 1 hour under flushing of dry nitrogen (100 ml/mn), then when temperature reaches 700° C., dry nitrogen gas flow (100 ml/mn) was replaced by gas (100 ml/mn) disclosed in following table before flushing during 2 hours, then the sample was cooled from 700° C. over 40 nm under dry nitrogen gas flow.

Performing humid atmosphere with $N_2$, CO or $CO/CO_2$ induce similar beneficial effect (electrochemical capacity increase), but experiments performed under pure CO or $CO/CO_2$ do not provide beneficial effect.

| Gas | Reference | BET (m$^2$/g) | [C] Wt. % |
|---|---|---|---|
| $N_2$ bubbled in $H_2O$ at 80° C. | C-LiFePO$_4$-LF-R-HN | 14.7 | 1.5 |
| CO bubbled in $H_2O$ at 80° C. | C-LiFePO$_4$-LF-R-HC | 14.9 | 1.6 |
| $CO/CO_2$ bubbled in $H_2O$ at 80° C. | C-LiFePO$_4$-LF-R-HM | 14.6 | 1.4 |
| CO | C-LiFePO$_4$-LF-R-C | 13.4 | 1.9 |
| $CO/CO_2$ | C-LiFePO$_4$-LF-R-M | 13.7 | 1.8 |

Example 7

Lab-Retreatment of Laboratory Synthesized C—LiFeMPO$_4$

C—LiFeMPO$_4$-LF (M=Co, B) obtained in comparative example 6 were retreated as in example 4. Those materials, named C—LiFeMPO$_4$-LF-RW700, have following specific surface and carbon content:

| M | Surface area (m²/g) | Carbon content (Wt. %) |
|---|---|---|
| Co | 15.2 | 1.6 |
| B | 14.9 | 1.5 |

Example 8

Lab-Retreatment of Rotary Kiln Synthesized C—LiFePO$_4$

C—LiFePO$_4$-3-RK obtained in comparative example 1 was retreated at various temperature. For each temperature, in an airtight container, placed into a furnace and with a gas inlet and outlet, 20 g of C—LiFePO$_4$-3-RK in a ceramic crucible was heat up to T$_{max}$° C. in 1 hour under flushing of dry nitrogen (100 ml/mn), then when temperature reach T$_{max}$° C., dry nitrogen gas flow (100 ml/mn) was replaced by nitrogen gas (100 ml/mn) bubbled in water (80° C.) before flushing for 2 hours. Then the sample was cooled from T$_{max}$° C. over 1 hour under dry nitrogen gas flow.

Experiments have been performed at T$_{max}$ of 50, 200, 400, 600, 700, 750 and 800° C. and each corresponding products named C—LiFePO$_4$-3-RK-WT$_{max}$. Similar experiments have been performed at T$_{max}$ of 50, 200, 300, 400, 500, 600, 700, 750° C. with sample C—LiFePO$_4$-7-RK, each corresponding products named C—LiFePO$_4$-7-RK-WT$_{max}$.

Example 9

Lab-Retreatment of Rotary Kiln Synthesized C—LiFePO$_4$

C—LiFePO$_4$-9-RK obtained in comparative example 1 was retreated at 700° C. for various time. For each time (t), in an airtight container, placed into a furnace and with a gas inlet and outlet, 20 g of C—LiFePO$_4$-9-RK in a ceramic crucible was heat up to 700° C. in 1 hour under flushing of dry nitrogen (100 ml/mn), then when temperature reach 700° C., dry nitrogen gas flow (100 ml/mn) was replaced by nitrogen gas (100 ml/mn) bubbled in water (80° C.) before flushing for t hours. Then the sample was cooled from 700° C. over 1 hour under dry nitrogen gas flow.

Experiments have been performed during time t of 0.5, 1, 3 and 5 hours and each corresponding products named C—LiFePO$_4$-9-RK—W-t-700.

A similar experiment has been performed with C—LiFePO$_4$—PP—RK (powder/powder synthesis) retreated during 3 hours at 700° C. The material, named C—LiFePO$_4$—PP—RK—W700, has a carbon content of 1.3 wt. %. Initial electrochemical capacity (1$^{st}$ cycle, C/12) of C—LiFePO$_4$—PP—RK increased from 140 mAh/g to 158 mAh/g, and from 120 mAh/g to 145 mAh/g at 1C, and from 60 mAh/g to 106 mAh/g at 100, after retreatment.

Example 10

Synthesis of C—LiFePO$_4$ in a Rotary Kiln Under Water Vapor

Ten (10) experiments of comparative example 1 were repeated with mixture coming from same batch for each FePO$_4$.2H$_2$O lot, except that in addition to dry nitrogen gas inject in the feed zone, humid nitrogen gas (bubbled in water at 35-40° C.) was injected in the rotary kiln in the middle of the zone corresponding to the 700° C. 1 hour heat treatment step.

Synthesized products were named as C—LiFePO$_4$—X—RK—W700 (1≤X≤10).

Similar experiments have been performed for C—LiFeMnPO$_4$—X—RK of comparative example 2 to provide C—LiFeMnPO$_4$—X—RK—W700 (1≤X≤10) products.

Similar experiments have been performed for C—LiFeMgPO$_4$—X—RK of comparative example 3 to provide C—LiFeMgPO$_4$—X—RK—W700 (1≤X≤10) products.

Example 11

Synthesis of C—LiFePO$_4$ in a Dual Rotary Kiln

Ten (10) experiments of example 1 were repeated with mixture coming from same batch for each FePO$_4$.2H$_2$O lot. At the outlet of first rotary kiln, product was feed in a second rotary kiln throughout a screw conveyor, operated under dry nitrogen, and heat treated during 2 hours at 700° C. under a flow of humid nitrogen. An exhaust is placed before outlet of second kiln to recover C—LiFePO$_4$ with a low moisture content (<500 ppm). Atmosphere of both rotary kilns are controlled independently.

Synthesized products were named as C—LiFePO$_4$—X—RK-700-2S (1≤X≤10).

Example 12

Synthesis of C—LiFePO$_4$ in a Multizone Rotary Kiln

Ten (10) experiments of example 1 were repeated with mixture coming from same batch for each FePO$_4$.2H$_2$O lot. At the outlet of first rotary kiln, product was feed in a second rotary kiln throughout a screw conveyor, operated under dry nitrogen, and heat treated during 2 hours at 700° C. under a flow of humid nitrogen. At the outlet of second rotary kiln, product was feed in a third rotary kiln throughout a screw conveyor, operated under dry nitrogen, and heat treated during 30 min under dry nitrogen to recover C—LiFePO$_4$ with a low moisture content (<100 ppm). Atmosphere of three rotary kilns are controlled independently.

Synthesized products were named as C—LiFePO$_4$—X—RK-700-3S (1≤X≤10).

Similar experiments have been performed but with a retreatment step in second kiln operated at 800° C. during 30 minutes.

Synthesized products were named as C—LiFePO$_4$—X—RK-800-3S (1≤X≤10).

Example 13

Preparation of Liquid Electrolyte Batteries

Liquid electrolyte batteries were prepared according to the following procedure.

A cathode material of the present invention, PVdF-HFP copolymer (supplied by Atochem), and EBN-1010 graphite powder (supplied by Superior Graphite) were carefully mixed in N-methylpyrrolidone for one hour using zirconia beads in a Turbula® mixer in order to obtain a dispersion composed of the cathode/PVdF-HFP/graphite 80/10/10 by weight mixture. The mixture obtained was subsequently deposited, using a Gardner® device, on a sheet of aluminum carrying a carbon-treated coating (supplied by Exopack Advanced Coating) and the film deposited was dried under vacuum at 80° C. for 24 hours and then stored in a glovebox.

A battery of the "button" type was assembled and sealed in a glovebox, use being made of the carbon-treated sheet of aluminum carrying the coating comprising the material C—LiFePO$_4$, as cathode, a film of lithium, as anode, and a separator having a thickness of 25 μm (supplied by Celgard) impregnated with a 1M solution of LiPF$_6$ in an EC/DEC 3/7 mixture.

In the various batteries assembled according to this procedure, the cathode material comprises the material directly obtained by the process of example 4-6. The batteries were subjected to scanning cyclic voltammetry at ambient temperature with a rate of 20 mV/80 s using a VMP2 multichannel potentiostat (Biologic Science Instruments), first in oxydation from the rest potential up to 3.7 V and then in reduction between 3.7 and 2 V. Voltammetry was repeated a second time and capacity of the cathode material (in mAh/g) determined from the second reduction cycle.

| Battery cathode | C (mAh/g) |
| --- | --- |
| C-LiFePO$_4$-LF | 120 |
| C-LiFePO$_4$-LF-W | 148 |
| C-LiFePO$_4$-LF-W700 | 152 |

Similar batteries were also tested with intensiostatic discharge between 3.7 and 2.2 V at a rate of C/10, discharge curves for second cycle is provided in FIG. 1 for batteries containing C—LiFePO$_4$-LF (obtained in example 4) and C—LiFePO$_4$-LF-W (obtained in example 5).

Even if it is not fully described, advantageous effect of the invention has been evaluated with others carbon-deposited alkali metal oxyanion including, without any limitation, C—Li$_4$Ti$_5$O$_{12}$, C—LiVPO$_4$F, C—Li$_2$FeSiO$_4$, C—LiFe$_{0.65}$Mn$_{0.3}$Mg$_{0.05}$PO$_4$, C—LiFe$_{0.95}$Mg$_{0.05}$PO$_4$, while improving electrochemical performances of those material.

Although the present invention has been described in considerable detail with reference to certain embodiments thereof, variations and refinements are possible without departing from the spirit of the invention. All of the compositions and/or methods disclosed and claimed herein can be made and executed without undue experimentation in light of the present disclosure. While the compositions and methods of this invention have been described in terms of preferred embodiments, it will be apparent to those of skill in the art that variations can be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

All U.S. patents and patent applications cited throughout the specification are hereby incorporated by reference in their entirety.

The invention claimed is:

1. A process for preparing a heat-treated alkali metal oxyanion electrode material, said process comprising:
   (i) providing an alkali metal oxyanion electrode material comprising particles, said particles having carbon deposited on at least a portion of their surface by a thermal treatment; and
   (ii) heating under a humidified atmosphere said alkali metal oxyanion electrode material,
   wherein said heating is performed to a temperature in the range of about 300° C. to about 950° C.

2. The process according to claim 1, wherein said heating is performed to a temperature in the range of about 450° C. to about 850° C.

3. The process according to claim 1, wherein said humidified atmosphere comprises water steam, or gas which has been contacted with water, or a mixture thereof.

4. The process according to claim 1, wherein said humidified atmosphere comprises a gas selected from the group consisting of N$_2$, argon, helium, NH$_3$, CO, CO$_2$, and any mixtures thereof.

5. The process according to claim 1, wherein said heating under a humid atmosphere is performed for a duration of time of about 10 minutes to about 10 hours.

6. The process according to claim 1, wherein said heating step under a humidified atmosphere is performed in a rotary kiln, a push kiln, a fluidized bed, or a belt-driven kiln.

7. The process according to claim 1, wherein said process comprises reducing the carbon-content of the material.

8. The process according to claim 1, being performed in a chemical reactor, wherein said heating under a humidified atmosphere is performed at a first zone of said chemical reactor.

9. The process according to claim 8, wherein said alkali metal oxyanion electrode material having carbon coating deposited by a thermal treatment is fed at a second zone of said chemical reactor.

10. The process according to claim 1, wherein said alkali metal oxyanion electrode material comprises particles having the general formula C-A$_a$M$_m$M'$_{m'}$Z$_z$O$_o$N$_n$F$_f$, wherein:
   A comprises at least one alkaline metal selected from the group consisting of Li, Na and K;
   M comprises at least one transition metal;
   M' comprises at least one non-transition metal;
   Z comprises at least one non-metal selected from the group consisting of S, Se, P, As, Si, Ge and B;
   O is oxygen;
   N is nitrogen and F is fluorine; and
   the coefficients a, m, m', z, o, n and f are chosen independently so as to ensure electroneutrality of the complex oxide, and meet the following conditions:
   a≥0, m>0, z≥0, m'≥0, o>0, n≥0 and f≥0.

11. The process according to claim 1, wherein said alkali metal oxyanion electrode material comprises particles having the general formula C—LiMPO$_4$, which has an olivine structure, and wherein M comprises at least 90% at. Fe(II), or Mn(II), or a mixture thereof.

12. The process according to claim 10, wherein M comprises Fe(II), Mn(II), or a mixture thereof.

13. The process according to claim 1, wherein said carbon-deposited alkali metal oxyanion is a micron-sized alkali metal oxyanion, wherein said carbon-deposited alkali metal oxyanion is obtained from a synthesis that includes a solid-state high-energy milling of precursors of said carbon-deposited alkali metal oxyanion.

14. The process according to claim 13, wherein high-energy milling is high-energy ball milling.

15. The process according to claim 13, wherein said process is applied after said synthesis of carbon-deposited alkali metal oxyanion.

* * * * *